(12) United States Patent
Enright

(10) Patent No.: US 7,130,813 B2
(45) Date of Patent: Oct. 31, 2006

(54) PROCESS FOR OPTIMAL ECONOMIC EFFICIENCY IN POSTAL OPERATIONS

(75) Inventor: James J. Enright, Las Vegas, NV (US)

(73) Assignee: EPCO LLC, Las Vegas, NV (US)

( * ) Notice: Subject to any disclaimer, the term of this patent is extended or adjusted under 35 U.S.C. 154(b) by 0 days.

(21) Appl. No.: 10/788,904

(22) Filed: Feb. 26, 2004

(65) Prior Publication Data
US 2004/0236595 A1    Nov. 25, 2004

Related U.S. Application Data

(63) Continuation of application No. 10/293,405, filed on Nov. 13, 2002, now abandoned.

(51) Int. Cl.
*G06F 17/30*    (2006.01)

(52) U.S. Cl. .............................. 705/10; 705/1

(58) Field of Classification Search ............ 705/1, 705/10
See application file for complete search history.

(56) References Cited

U.S. PATENT DOCUMENTS

| | | | | |
|---|---|---|---|---|
| 2,072,401 A | * | 3/1937 | Koenigs et al. ............ | 546/334 |
| 3,606,728 A | | 9/1971 | Sather et al. | |
| 3,819,173 A | * | 6/1974 | Anderson et al. ......... | 270/52.04 |
| 3,877,531 A | * | 4/1975 | Storace et al. ............ | 177/1 |
| 4,384,196 A | * | 5/1983 | McCumber et al. ....... | 235/375 |
| 4,639,873 A | | 1/1987 | Baggarly et al. | |
| 4,797,830 A | * | 1/1989 | Baggarly et al. .......... | 705/406 |
| 4,800,505 A | | 1/1989 | Axelrod et al. | |
| 4,817,042 A | | 3/1989 | Pintsov | |
| 4,959,795 A | | 9/1990 | Christensen et al. | |
| 4,999,481 A | | 3/1991 | Baer et al. | |
| 5,060,165 A | * | 10/1991 | Schumacher et al. ..... | 700/213 |
| 5,264,665 A | * | 11/1993 | Delfer, III ............... | 177/25.15 |
| 5,287,271 A | * | 2/1994 | Rosenbaum ............... | 705/8 |
| 5,367,450 A | | 11/1994 | Pintsov | |
| 5,628,249 A | | 5/1997 | Cordery et al. | |
| 5,684,706 A | * | 11/1997 | Harman et al. ........... | 700/95 |

(Continued)

FOREIGN PATENT DOCUMENTS

DK    EP 0 805 421 A2 * 11/1997

(Continued)

OTHER PUBLICATIONS

John W. Sutherland, "A Quasi-Empirical Mapping of Optimal Scale of Enterprise", Oct. 1980, Management Science (pre-1986), vol. 26, No. 10, ABI/INFORM Global, p. 963.*

*Primary Examiner*—John G. Weiss
*Assistant Examiner*—Cang (James) G. Thai
(74) *Attorney, Agent, or Firm*—Katten Muchin Rosenman LLP

(57) ABSTRACT

A process for optimal economic efficiency in postal operations generally comprises the steps of conveying objects from a first repository to a second repository and pre-processing a combination from among at least one of said objects based on assigned criteria, such as variable pricing methods, to derive further value from these operations. The pre-processing collects recipient-specific optimized combinations of objects and stores them as deliverables in a storage system. Such pre-processing obviates the need for set ups required under the prior art thereby reducing operational costs, including the indirect costs of equipment "down time". Pre-processing further achieves the postal discounts offered by the U.S. Postal Service thereby eliminating the need for the additional pre-sorting systems required under the prior art. Moreover, variable pricing methods are employed to optimize the economic potential of these operations.

24 Claims, 5 Drawing Sheets

An Offline Packet Construction Device for Postal Inserts and Return Envelopes

U.S. PATENT DOCUMENTS

| | | | |
|---|---|---|---|
| 5,816,715 A * | 10/1998 | Harman et al. | ............... 400/71 |
| 6,064,994 A * | 5/2000 | Kubatzki et al. | ........... 705/410 |
| 6,360,001 B1 * | 3/2002 | Berger et al. | .............. 382/101 |
| 2002/0133472 A1 | 9/2002 | Stepno | |
| 2002/0145245 A1 | 10/2002 | Casto et al. | |
| 2002/0195765 A1 | 12/2002 | Tunink et al. | |
| 2004/0064326 A1 * | 4/2004 | Vaghi | ........................... 705/1 |

FOREIGN PATENT DOCUMENTS

| | | |
|---|---|---|
| EP | 0 153 813 | 9/1985 |
| GB | 2 193 332 | 2/1988 |

* cited by examiner

Figure 1: An Offline Packet Construction Device for Postal Inserts and Return Envelopes
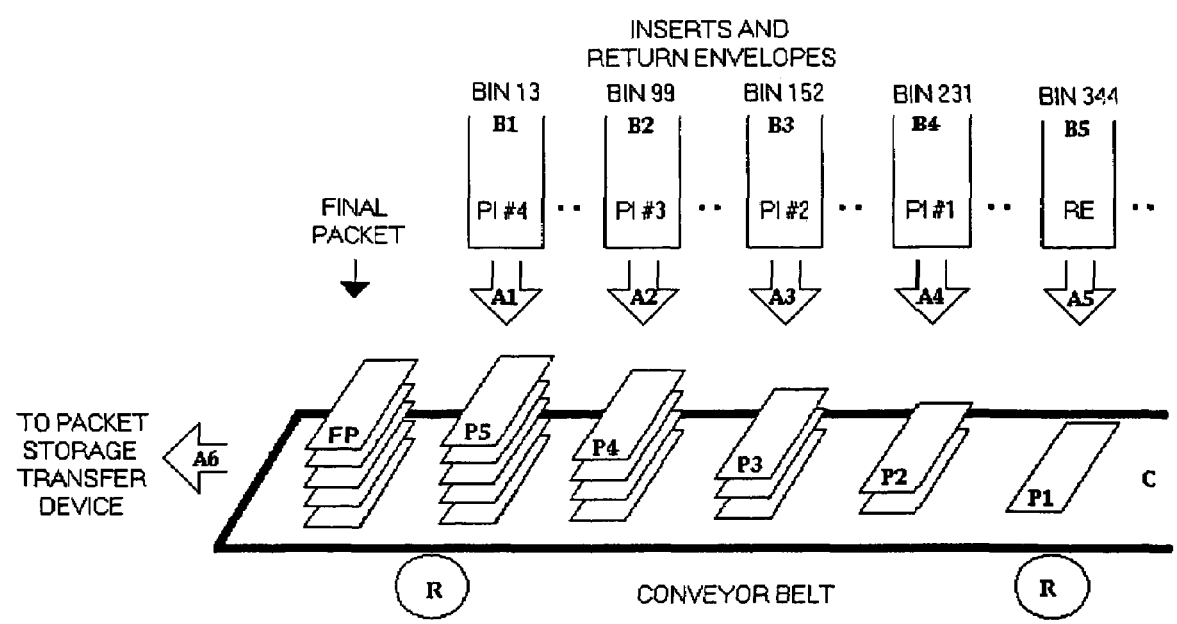

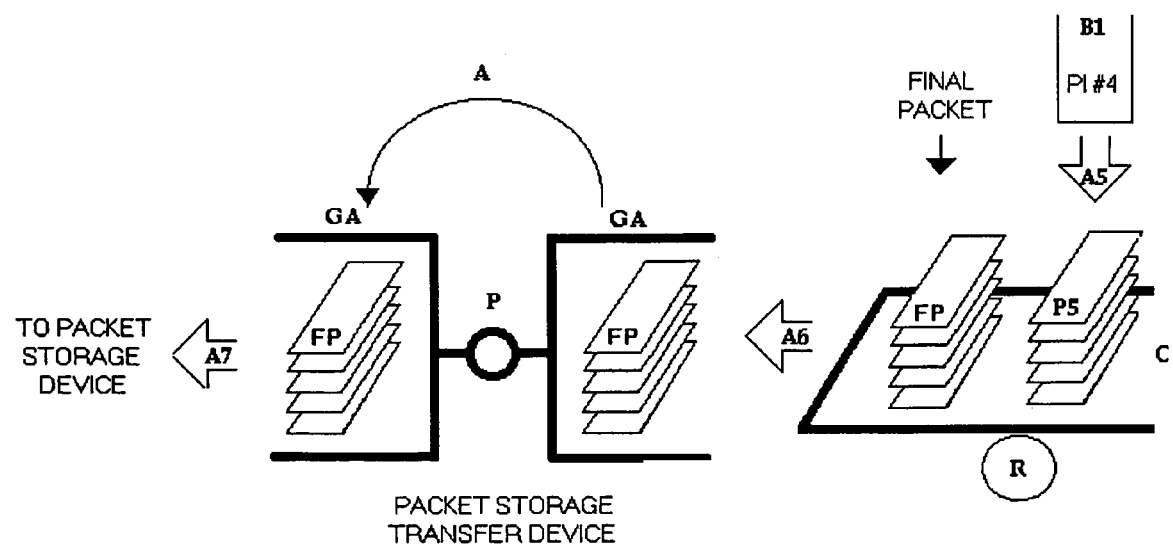
Figure 2: An Offline Packet Storage Transfer Device

Figure 3: An Offline Packet Storage Device
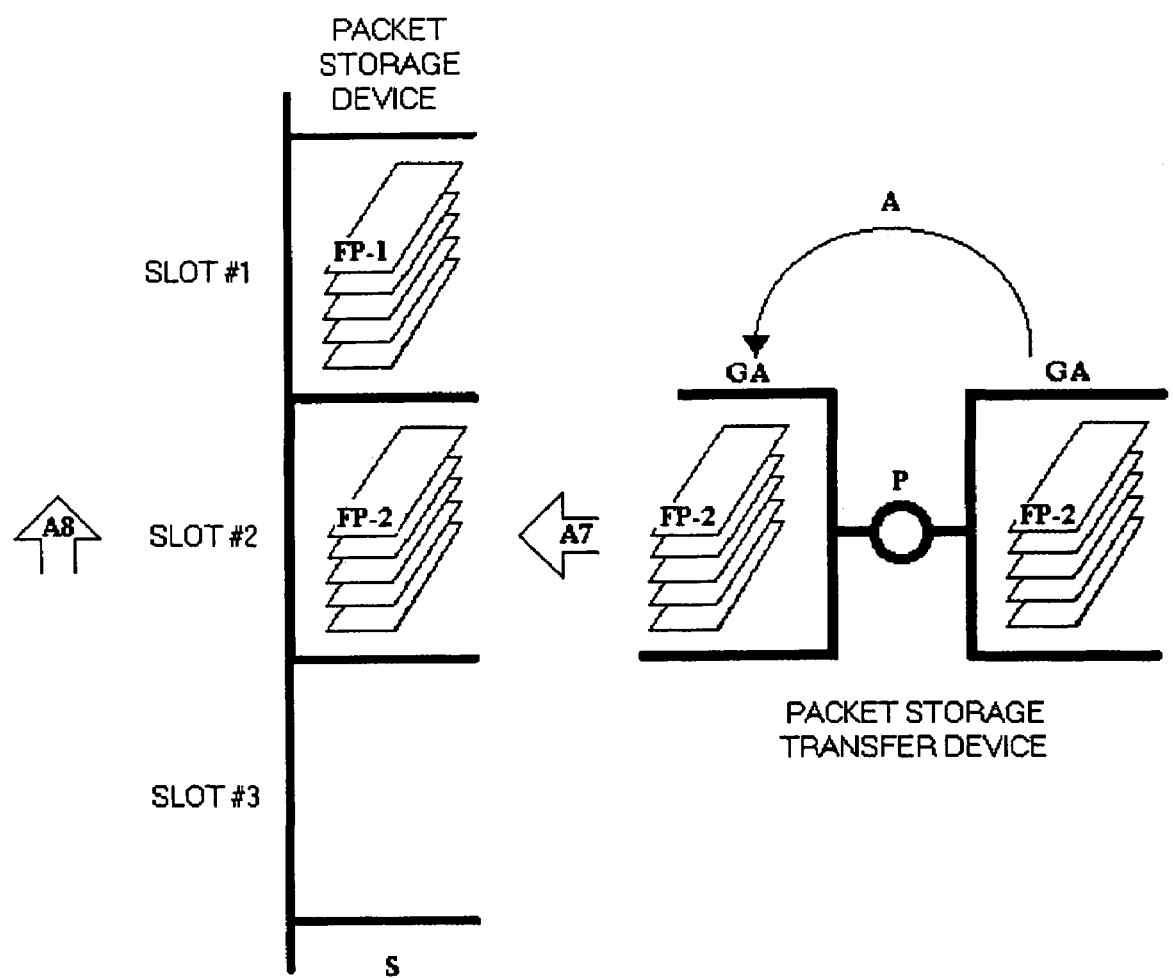

Figure 4: An Online Packet Retrieval Transfer Device
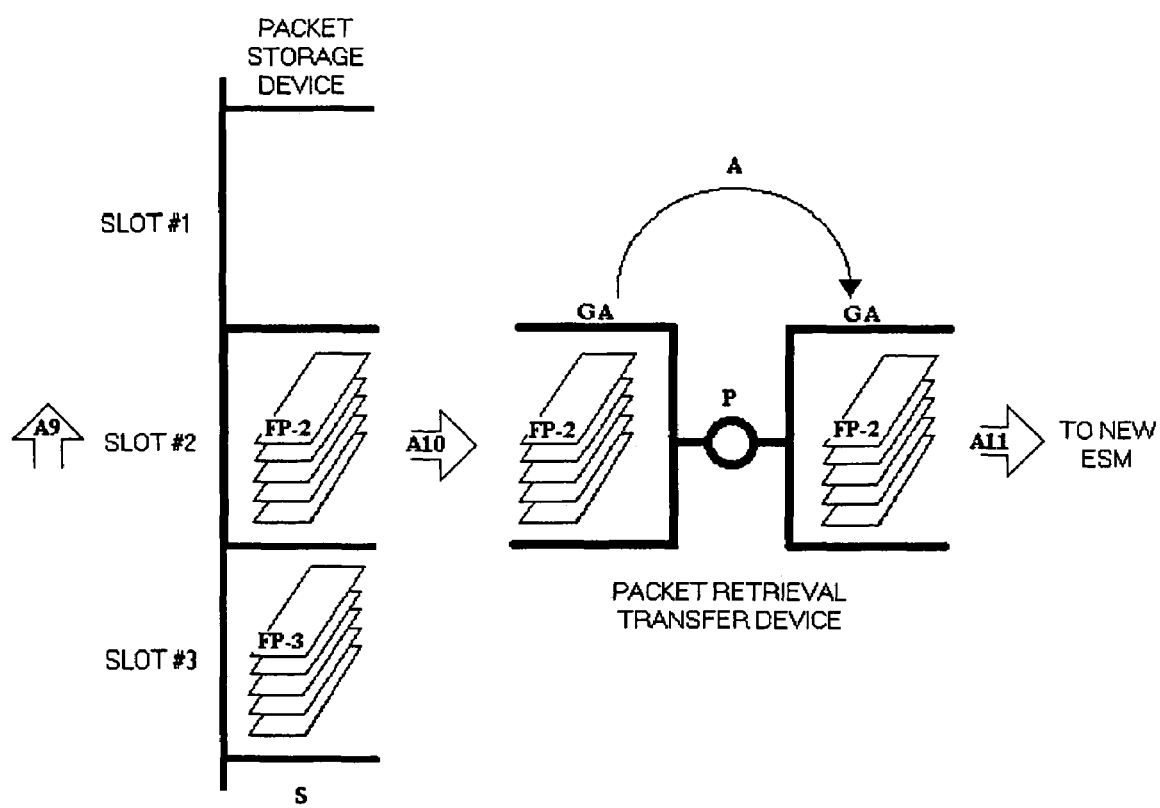

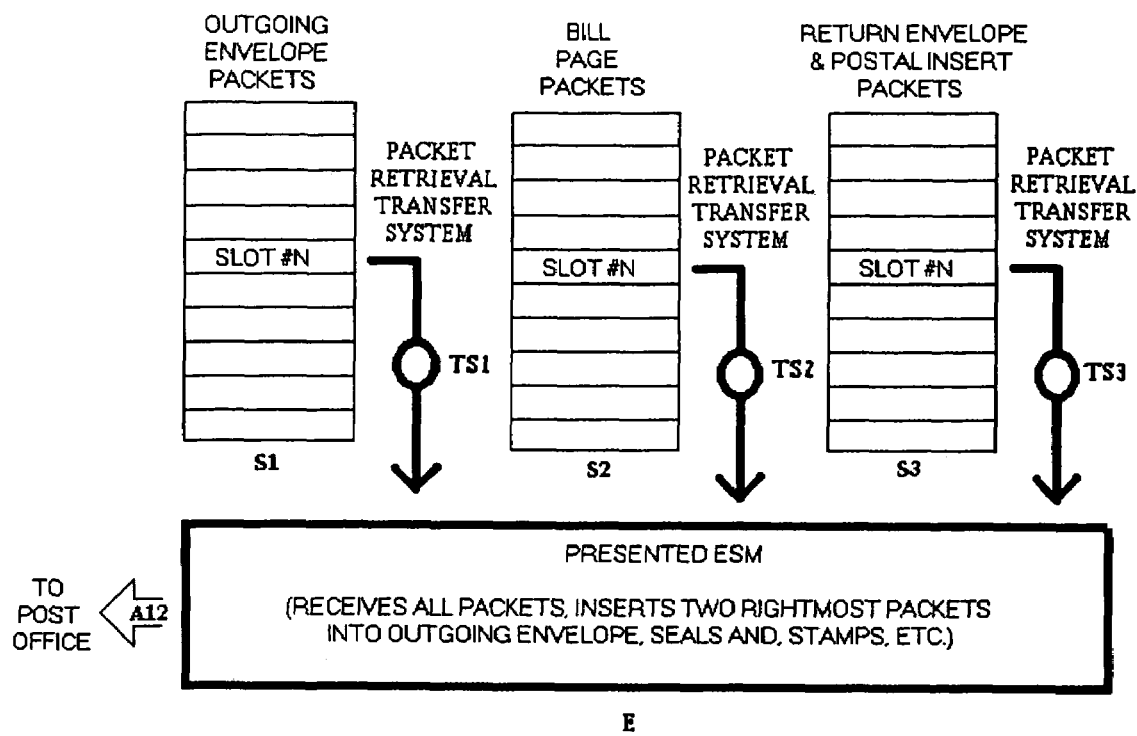
Figure 5: Presented ESM with All Postal Objects Delivered as Packets

PROCESS FOR OPTIMAL ECONOMIC EFFICIENCY IN POSTAL OPERATIONS

CROSS-REFERENCE TO RELATED APPLICATION

This application is a continuation of U.S. patent application Ser. No. 10/293,405 filed on Nov. 13, 2002 now abandoned, the contents of which are herein wholly incorporated by reference.

FIELD OF THE INVENTION

The invention relates to the field of hardware and software designed to collect and assemble diverse components (e.g., outgoing envelopes, return envelopes, business communications such as invoices, and third party communications) for mailing by the post, and related business processes.

BACKGROUND OF THE INVENTION

Many large companies (called "Communicators" in this application) engage in large scale mailing operations in order to communicate with their customers. These core communications, which can include billing or account statements and other missives required by law, are made regularly to a large number of customers. Credit card companies are an example of one such category of companies. Banks and other financial services companies, telecommunication companies, utility companies, and cable and satellite television companies are examples of other companies bearing high monthly recurring mailing obligations. A credit card company, for instance, typically mails billing statements at the end of every billing period (30 days or so) to its cardholders that used their credit card in the prior billing period or that still had outstanding balances. This is to inform their Customers of the amount of purchases they made using their card and thus owe the company. A Basic Mailing sent out to the Customers consists of the following Postal Objects:

An Outgoing Envelope
A number of pages itemizing the Customer's transactions
A Return Envelope The credit card company typically pays $0.27 (using the U.S. postal rate changes instituted in July 2002) for postage to mail the above Postal Objects, which generally weigh about 15 grams. However, due to the postal rate structure, the company has actually purchased the right to mail up to 1 ounce (28 grams) of material to that Customer for that same $0.27. That leaves 13 grams of unused or excess capacity. This Surplus Weight could be used for additional material to be mailed to a Customer with no increase in mailing costs. In practice, virtually every Basic Mailing would have Surplus Weight.

Such Basic Mailings represent a marketing opportunity for both the Communicators that have this Surplus Weight available in their core communications to their Customers as well as "third party" Marketers that seek effective and economical ways to gain access to prospective customers. This would be an even more appealing vehicle for many Marketers, if new technology would enhance the ability to customize messages. The Marketers' communications may take the form of a Postal Insert in the Communicators' mailings. A Postal Insert may be a single or multi-panel printed document. Postal Inserts are included in the Customer's mailing, thereby transforming the Basic Mailing into an Extended Mailing. Extended Mailings, like the Basic Mailing, consist of the Outgoing Envelope, a number of Bill Pages itemizing the customer's transactions, and a Return Envelope, but also a number of Postal Inserts.

In essence, the existence of Surplus Weight in Basic Mailings creates a market that can benefit both Marketers and Communicators. Besides various collateral benefits (e.g., credit card companies generate receivables from cardholders charging their card to buy the goods or services), the Communicators can generate additional fee income by offering Marketers the Surplus Weight for which they are paying but not utilizing. The Marketers are able to communicate with the Communicator's Customers at rates well below the $0.27 it would cost to mail directly to these Customers on their own. Consequently, a "Marketing Cycle" exists. The Marketers supply Postal Inserts to the Communicators. The Communicators integrate them with their communications to their Customers. The Customers receive the Postal Inserts, and some respond to the Marketers' offers by purchasing their goods or services thus completing the Marketing Cycle.

The benefits that could be realized by Marketers and Communicators are substantial, so Extended Mailings would be expected to be a common, widespread practice. This has not been the case, however, because the supporting technology and processes have been inefficient. This inefficiency is evidenced, among other things, by the Communicators' chronic and significant under-utilization of available Surplus Weight, and their forgoing the use of demonstrably substantial marketing revenue and other forms of value. The inefficiency is, in large part, due to structural problems in the relations between Marketers and Communicators, and limitations embedded in the prior art technology provided by the firms that supply the machinery and services that perform automated mailing operations ("Transmitters") (see, e.g., the Phillipsburg Inserters summarized by Baggarly U.S. Pat. No. 4,639,873). Further, as a practical matter, these problems cannot be fully rectified until the prior art technology and processes are replaced by the technology and processes presented herein.

In essence, the problem for the Communicators is how to maximize the value that can be realized from the sale or other use of the Surplus Weight in their core mailings at minimum cost. Value is a broad and general measure of benefit. Value often can be defined as pure revenue, in which case the problem is equivalent to maximizing profits. Value also can encompass managerial mandates that may override pedantic profit calculations. The presented invention offers the opportunity for lasting, optimal economic efficiency in many operations related to postal mailings. Other industries faced with complex distribution or allocation problems for goods and services could also benefit from the economic efficiencies derived from the system and method presented. However, since most of the problems of the prior art are indicated in the poor management of Surplus Weight in Postal Insert operations, the discussion of the presented invention will focus on that aspect.

As discussed below, the economic situations of the Communicators and Marketers provide a foundation of the criticism of the prior art. The crux of the problem is that current technology needlessly interrupts Postal Item processing, thereby artificially inflating costs. This would be a serious impediment in and of itself even if value and/or revenue of Postal Insert operations were being maximized. Yet the current technology impedes the economic efficiency of these operations further by simultaneously preventing anything remotely close to value maximization from occurring.

Value/Revenue Side of Postal Insert Operations: Marketer-Communicator Relations

Marketers typically pay a Customer Access Charge for a Communicator to deliver the Marketer's Postal Insert to the Communicator's Customers as part of the Communicator's Extended Mailing. This price clearly must be less than what the Marketer would pay were it to mail directly to the Customer. However, the Marketer is taking a risk. If the Customer does not purchase the goods or services offered then the Marketer suffers a loss of a Customer Access Charge and all other related costs. If the Customer does purchase the goods or services then the Marketer achieves a profit (assuming its profit from the sale is greater than the Customer Access Charge and all related costs).

The economics for determining whether a profit-maximizing Marketer should take the risk of sending a Postal Insert to a Customer is based on the concept of Expected Net Profit and are relatively basic. The Marketer knows what the Gross Profit for the goods or services is: this is simply the sale price minus the production costs. Given that, the Expected Net Profit of offering goods or services via a Postal Insert campaign can be determined.

The Expected Net Profit of mailing a Postal Insert to a Customer is computed as the Expected Gross Profit minus the Total Insert Costs. From the Marketer's perspective, Total Insert Costs are the sum of the Printing Cost, the Customer Access Charge, the Inserting Cost, and any other per Postal Insert costs. The Customer Access Charge is the fee the Marketer pays the Communicator to include a Postal Insert in an Extended Mailing. The related incremental cost of inserting the Postal Insert into an Extended Mailing is typically very low and might not be an explicit itemized charge. As Marketers generally are only concerned with a combined total cost per Postal Insert they might be presented with just a single, combined price per Postal Insert.

Gross Profit is the uncertain result of sending a Postal Insert to the Customer since there is no guarantee that it will act upon the offer. However, there is an Expected Gross Profit: this is the Gross Profit multiplied by the Probability of Success. The Probability of Success is the likelihood the Customer will respond to a Postal Insert by making a purchase.

Expected Net Profit provides the economic measure of whether the risk of sending a Postal insert is justified. Expected Net Profit is the Expected Gross Profit of a mailing minus the Total Costs of the mailing. Customers with Expected Net Profit greater than 0 are "good" marketing bets. Customers with Expected Net Profit less than 0 are "bad" marketing bets. Put another way, marketing campaigns directed towards Customers with Expected Net Profits greater than 0 should yield profits from the sale of goods and services that are greater than all related costs.

Under prevailing pricing policies Marketers incur costs in the form of Customer Access Charges for the right to send a Postal Insert to a Communicator's Customer. This Customer Access Charge is typically fixed and identical for all Customers. The Communicator sets or negotiates a single, constant Customer Access Charge applying to all Customers. The profit-seeking Marketer accordingly seeks to restrict its Postal Inserts to Customers whom they determine to have sufficiently high Probabilities of Success in relation to that cost. This is the only way to insure their Expected Net Profits are greater than 0 given that all other factors affecting Expected Net Profit are fixed. Table 1 gives a side-by-side comparison of two Customers with different Probabilities of Success.

TABLE 1

| | Customer 1 | Customer 2 | Difference (2 − 1) |
|---|---|---|---|
| 1. Probability of Success | 0.0100 | 0.0080 | −0.0020 |
| 2. Gross Profit | $5.0000 | $5.0000 | $0.0000 |
| 3. Printing Cost | $0.0050 | $0.0050 | $0.0000 |
| 4. Customer Access Charge | $0.0400 | $0.0400 | $0.0000 |
| 5. Inserting Cost | $0.0010 | $0.0010 | $0.0000 |
| 6. Other Cost | $0.0000 | $0.0000 | $0.0000 |
| 7. Expected Gross Profit (1 * 2) | $0.0500 | $0.0400 | $0.0100 |
| 8. Total Costs (3 + 4 + 5 + 6) | $0.0460 | $0.0460 | $0.0000 |
| 9. Expected Net Profit (7 − 8) | $0.0040 | −$0.0060 | −$0.0100 |
| 10. Expected Net ROI (100 * 9/8) | 8.6957% | −13.0435% | −21.7392% |

Customer 1 has a Probability of Success for the Marketer that, given the other components, yields an Expected Net Profit greater than 0. But Customer 2 has a lower Probability of Success for the Marketer that, given the other components, yields an Expected Net Profit less than 0.

Marketers desiring profitable marketing campaigns typically seek to restrict mailings of Postal Inserts to Customers like Customer 1. They may control the recipients of their Postal Inserts by supplying the Communicators with a list of names and addresses of desired Customers. Communicators then perform a "merge and purge" operation that compares the Marketer's list to the Communicator's master customer list to identify which of those desired Customers can be processed through the use of the Communicator's Surplus Weight.

As an aside, there are a number of commercially available databases and information sources that provide quite a bit of information at the customer and household level (approximately 100 million households in the U.S in July 2002). Marketers can obtain a large body of useful information on potential customers to estimate Probabilities of Success. This information includes:

Gender
Age
Ethnicity
Creditworthiness
Household income
Automobile characteristics
Number of children in household
Age distribution of children
Past marketing success by Marketer
Nielsen television classification
Other Problems on the Value/Revenue Side of Postal Insert Operations: Marketer-Communicator Relations In a truly economically efficient environment, Marketers would be agreeable to any opportunity that carried an Expected Net Profit greater than 0 and any opportunity that was mutually beneficial to Marketers and Communicators could be offered. Marketers, on the whole, are rationally responding to the pricing conditions presented them by restricting recipients to those with presumed higher Probabilities of Success, and hence, Expected Net Profit greater than 0. Yet Communicators have so far not fostered mutually beneficial relations with Marketers.

Communicators consistently failing to generate any value whatsoever from the many millions of Surplus Weight opportunities they possess, at a given price, should be amenable to lowering the price to any level that remains profitable for them. Unless they do so they will find themselves in a situation of their own making wherein they repeatedly miss out on value/revenue opportunities. Under the prevailing Fixed Pricing scheme they are issuing implicit dictums to Marketers to "take it or leave it" at the set Customer Access Charge. The Marketers' rational response is quite often to "leave it" when their Expected Net Profit falls below 0. However, if the Customer Access Charge were lowered for Customers whose Expected Net Profits are less than 0, then the Marketers' Expected Net Profits would increase. Were the price lowered to a point at which the Marketers' Expected Net Profits were greater than 0 that still was greater than the processing cost then a "win-win" situation would be achieved. Customers who under Fixed Pricing neither offered Expected Net Profit greater than 0 to the Marketers nor generated value or revenue for the Communicators have been transformed: they now offer Expected Net Profits greater than 0 to the Marketers thus warranting a Postal Insert. The Marketers benefit from gaining cost effective, profitable access to a broader universe of prospects. And the Communicators benefit by generating additional value and/or revenue from the available Surplus Weight where previously no value or revenue could be generated. Table 2 shows the same two Customers depicted in Table 1.

TABLE 2

|  | Customer 1 | Customer 2 | Difference (2 − 1) |
|---|---|---|---|
| 1. Probability of Success | 0.0100 | 0.0080 | −0.0020 |
| 2. Gross Profit | $5.0000 | $5.0000 | $0.0000 |
| 3. Printing Cost | $0.0050 | $0.0050 | $0.0000 |
| 4. Customer Access Charge | $0.0400 | $0.0300 | −$0.0100 |
| 5. Inserting Cost | $0.0010 | $0.0010 | $0.0000 |
| 6. Other Cost | $0.0000 | $0.0000 | $0.0000 |
| 7. Expected Gross Profit (1 * 2) | $0.0500 | $0.0400 | $0.0100 |
| 8. Total Costs (3 + 4 + 5 + 6) | $0.0460 | $0.0360 | $0.0000 |
| 9. Expected Net Profit (7 − 8) | $0.0040 | $0.0040 | $0.0000 |
| 10. Expected Net ROI (100 * 9/8) | 8.6957% | 11.1111% | 2.4154% |

However, in Table 2, the Customer Access Charge has been lowered from $0.04 to $0.03. In doing so, the Communicator has increased the Marketer's potential Expected Net Profit for Customer 2 from a loss of $0.006 to a profit of $0.004. In terms of Expected Net ROI, Customer 2 actually has become a better marketing bet for the Marketer because its Expected Net ROI of 11.111% exceeds the Expected Net ROI of 8.696% for Customer 1. Expected Net ROI provides direct comparisons between Customers in terms of expected returns per dollar spent. The Communicator now could generate an operating profit of $0.029 (the Customer Access Charge of $0.030 minus its Inserting Cost of $0.001) should it permit the Marketer's Postal Insert to use some of the Surplus Weight. The price reduction has transformed a previously ignored Customer into a profit opportunity for both the Marketer and the Communicator. Lloyds of London, an innovative insurance company, had the motto "There are no bad insurance risks, only bad insurance premiums". The analog for the Postal Insert industry ought to be "There are no bad marketing risks, only bad Customer Access Charges".

Cost Side of Postal Insert Operations: Marketer-Transmitter Relations

Effective leveraging of their Surplus Weight requires the Communicators to negotiate with a multitude of Marketers to achieve multiple Postal Inserts per Customer. Essentially, the different Marketers provide the Communicators with lists of the Customers to whom they would like to send Postal Inserts, and the Communicators must coordinate these various demands for access to their Customers.

Communicators typically sequentially process Marketers' lists in "merge and purge" operations, whereby Customers in the Communicator's mailing list that also appear in the Marketers' mailing lists are identified. Those Customers that are common to both the Communicator's and a Marketer's lists are then assigned the particular Marketer's Postal Insert unless it would violate either the Surplus Weight constraint or a possible Maximum Postal Inserts per Customer constraint.

All Customers will be scheduled to receive from 0 to some maximum number of Postal Inserts (e.g., 4) as a result of this Assignment process. Once the Assignment process has been completed, final processing can take place. Final processing is the Construction process performed by the Envelope Stuffing Machine ("ESM"). In the Construction process, all Postal Objects a Customer is to receive are collected and assembled into a Postal Item ready to be mailed. The ESM that perform this are well described in the Baggarly patent.

The basic unit of direct costs for Postal Insert operations under prior art technology is the "Set Up". Each Set Up requires an interruption of ESM processing operations in order to change the contents of the bins described in the Baggarly patent. Changes in bin contents are required whenever a Customer to be processed has a combination of assigned Postal Inserts that cannot be formed from the contents of the bins as then configured. Set Up costs are practically the only direct Postal Insert operating costs faced by Communicators. These direct costs mainly consist of the cost of a technician's time to change the bin contents.

Problems on the Cost Side of Postal Insert Operations: Marketer-Transmitter Relations Revenue calculations in the Communicator's Assignment process are straightforward. Whenever a Communicator assigns a Postal Insert to a Customer, the incremental revenue generated is clearly known. It is the negotiated charge for including the Postal Insert multiplied by the number of Assignments for that Postal Insert. The incremental costs attributable to the additional Insert, on the other hand, are essentially unpredictable.

Were a Communicator's incremental cost attributable to the Insert limited to the cost of actual ESM insertion (e.g., electricity usage) then the cost would be predictable. The Communicator's economics would be as simple as the Marketer's economics. The Communicator would only need to compare the incremental value or revenue generated by the Postal Insert to the incremental inserting cost to further refine the Assignment process. Its Assignment policy would be that the addition of the Postal Insert did not violate the Surplus Weight constraint or the Maximum Insert Per Customer constraint, and had sufficient value to cover its incremental cost. In practice, the pure marginal cost of inserting a Postal Insert (electricity needed to insert a Postal Insert) is miniscule and virtually never explicitly accounted for Unfortunately, under the prior art technology the true incremental cost of adding Postal Inserts beyond the initial Set Up configurations is both complex and practically unpredictable at Assignment time. The addition of a Postal Insert through the Assignment process clearly requires the allocation of an additional bin. Yet, as is explained below, the addition of one Postal Insert generally further requires the allocation of more than that one additional bin.

The core problem under the prior art is its discontinuous economics. Generally, after the first Set Ups are configured for each machine, the Assignment of even one additional Postal Insert to the existing initial set of Inserts mandates the allocation of more than just one additional bin. Moreover, whenever the number of additional required bins exceeds the number of available bins left in the prior Set Up, these additional bins further require a new Set Up.

This unfortunate cost consequence is illustrated by the following example. Suppose an Assignment process has used 10 Postal Inserts, a number equal to the number of bins in a sample Phillipsburg Inserter. Further, suppose that seven Customers groups, each with four Postal Inserts, are produced as a result of the Assignment process. The first group of Customers is assigned Postal Inserts 1 through 4. The second group of Customers is assigned Postal Inserts 2 through 5, and, so on, up to the seventh group that is assigned Postal Inserts 7 through 10. Lastly, suppose an eighth Customer group is created with just three Postal Inserts: Postal Inserts 8 through 10. Up to this point it is clear that one Set Up, with the 10 Postal Inserts populating the bins, would constitute the total costs for Postal Insert processing. However, were an $11^{th}$ Postal Insert assigned that added a $4^{th}$ Postal Insert to the eighth Customer Group above, a total of four additional bins would be required. This is because, under the current technology, the eighth Customer group cannot be supplied Postal Inserts from the first Set Up due to the presence of the eleventh Postal Insert and, therefore, must be supplied its Postal Inserts through a new Set Up. However, because the eighth Customer group also demands Postal Inserts 8 through 10, a total of four additional bins immediately must be allocated in the new Set Up.

Importantly, the additional Assignment of a Postal Insert spawning the need for more than one additional bin can further replicate itself many times in a multi-ESM environment where a large number of Marketers are seeking access to a Communicator's Customers. For example, suppose the Assignment of some first 10 Postal Inserts created the same initial Customer groups as before, and the Assignment of a second set of 10 Postal Inserts (e.g., Inserts 11 through 20) created an analogous eight Customer groups. A $21^{st}$ Postal Insert used by the Assignment process now might create the need for seven more bins. The $21^{st}$ Postal Insert would form two new Customer groups with combinations of Postal Inserts that cannot be constructed from the contents of the first Set Ups of the two machines. These are the combination of Postal Inserts 8, 9, 10, and 21 and the combination of Postal Inserts 18, 19, 20, and 21. As the number of Postal Inserts used by the Assignment process increases, this phenomenon can get out of hand quickly. This is because the combination of new Postal Inserts with existing Postal Insert combinations to form new Postal Insert combinations cannot be satisfied by existing Set Up configurations. A simple metric can be used to gauge the problem: divide the total number of bins used in a day's production by the number of Postal Inserts used in the Assignment process. For Communicators that seek to capture significant value from their Surplus Weight this ratio may be quite high, i.e., well above one.

Serious attempts to extract the substantial unrealized value or revenue of Surplus Weight through the Assignment of a large selection of Postal Inserts are likely to have costs exhibiting undesirable increasing returns to scale. Increasing returns to scale in costs means that as the number of Postal Inserts added to the Assignment process increases by a given percent the costs required to process them through ESM increase by more than that given percent. In other words, the processing becomes less profitable as levels of activity increase and can even become unprofitable. Given the increasing returns to scale in costs and constant returns to scale (at best) in value or revenue, the number of Postal Inserts that can be profitably assigned in one day is severely limited. This limit is far below the maximum number of Postal Inserts that could be accommodated by the available Surplus Weight.

Processing dependent on Set Ups also spawns indirect costs. First, each Set Up takes time to perform. High levels of Set Ups per machine necessarily require significant processing interruptions ("down time") for the ESM. These interruptions reduce the amount of Customers that can be processed by an ESM in a given time period because it is idle when bin contents are being changed. Consequently, a Communicator that must have sufficient ESM to insure it meets its peak load (i.e., the daily billing cycle with the highest number of Customers) would need to purchase additional ESM for production. The real but indirect overhead cost of doing so is substantial.

Moreover, direct Set Up costs are sensitive to the order in which Customers are processed through the ESM. Suppose 20 different Postal Inserts, denoted as Insert 1 through Insert 20, were available to the Assignment process and, due to the Assignment process, all Customers fell into one of two groups. The first group contains Customers whose assigned Postal Inserts consist of combinations of Postal Inserts 1 through 10 only; the second group contains Customers whose assigned Postal Inserts consist of combinations 11 through 20 only. The minimum number of Set Ups required to process these Customers is two. One Set Up fills the assumed 10 bins with Postal Inserts 1 through 10.

The other Set Up fills the assumed 10 bins with Postal Inserts 11 through 20. Any order of processing that did not process all of one group before beginning to process all of the other group would necessarily result in more than two Set Ups, and thus increase direct Set Up costs. Still, while this processing order will minimize Set Up costs it is extremely unlikely that it would achieve the highest possible postal discounts.

The U.S. Postal Service offers discounts to high-volume mailers if they deliver their mailings essentially sorted by zip code. Thus, additional indirect costs of the current technology are either that postal discounts must be forgone or that additional systems and personnel to pre-sort the output from the current ESM must be employed. The ideal technology would have the cost-minimizing processing order also be the order that achieves the maximum postal discounts.

Overall, prior art technology needlessly demands that technicians be on hand throughout the day to provide the exact same number and type of Postal Objects in "dribs and drabs" due to the interruptions caused by the Set Ups. The prior art technology has solved the technical problem of adding Postal Inserts to the set of components going out as a Postal Item on a relatively small scale (i.e., with relatively small numbers of Postal Insert combinations existing in the customer base). However, the prior art has not solved the technical problem of doing so on a large scale and in an economically efficient manner.

The system and particularly the method herein may be used in many other applications in which efficiency in the distribution or allocation of objects with assigned criteria, tangible or intangible, is impaired by poor pricing policies and/or lack of comprehensive pre-processing decision procedures. Poor pricing policies can prevent mutually beneficial transactions from taking place. Lack of comprehensive pre-processing decision procedures can prevent optimal sequencing of inter-related decisions from taking place particularly when complex cost issues exist. Such other applications could include distribution or allocation of unsold airline seats within or across airlines, or distribution or allocation of unsold shipping capacity within or across transportation companies.

Summary of Prior Art Methods to Address the Postal Insert Problem

The prevailing methods to solve the automated Postal Insert problem are outlined in the "Value/Revenue Side of Postal Insert Operations: Marketer-Communicator Relations" and the "Cost Side of Postal Insert Operations: Marketer-Transmitter Relations" sections. In the "Value/Revenue Side of Postal Insert Operations: Marketer-Communicator Relations" section, a typical Assignment process is described wherein Marketer demands for access to Customers are managed by sequentially processing the relevant "merged and purged" lists of the Marketers. The economic reasoning driving the composition of those lists is Expected Net Profit in an environment where Fixed Pricing policies dominate. The fundamental problem with the value/revenue side of the Postal Insert operations is the Fixed Pricing scheme.

In the "Cost Side of Postal Insert Operations: Marketer-Transmitter Relations" section, the cost side economic analysis of the prior art holds that Assignment of Postal Inserts has a direct, if complex, relationship with the dominant component of operating costs: the Set Up Charge. The fundamental problem with the cost side of the prior art is the disproportionate impact of expanded Postal Insert combinations on these costs. Failure to devise solutions to these problems with superior technology and business processes will continue to undermine economic efficiency in postal operations and prevent untold millions of "win-win" transactions for Marketers and Communicators.

SUMMARY OF THE INVENTION

The process presented replaces the prior art technology and restructures the business relations between Marketers and Communicators. The superceding technology presented moves collection and preparation of Postal Inserts to an Offline pre-process (i.e., a process that takes place outside the few seconds that it takes to assemble the components of a Customer's mailing into a mailable Postal Item). The Offline pre-process collects Customer-specific optimized combinations of Postal Inserts and stores them as a "Packet" in Postal Insert Offline Packet Storage Systems. Packets are sets of Postal Inserts that are treated as single components during final processing of Customer mailings. The presented technology for Pre-processed Packets obviates the need for the disruptive Set Ups and mounting costs required by prior art technology. It also removes the indirect costs of ESM "down time" and the inability to efficiently obtain the pre-sorting discounts offered by the U.S. Postal Service. Optionally, other components of Customer mailings (Outgoing Envelopes and Bill Pages) can also be pre-processed and stored in analogous Offline Packet Storage Systems. Generally, Outgoing Envelopes and Bill Pages are also capable of carrying additional information, and this ability can be further leveraged.

The presented process replaces the standard Fixed Pricing conventions of Marketer-Communicator relations with Variable Pricing relations. Under basic Variable Pricing Customer Access Charges are computed on a Customer-specific basis in order to equalize Expected Net Return on Investment (ENROI) across all Customers. Variable Pricing creates mutually beneficial situations for Marketers and Communicators by removing the artificial obstacles imposed by Fixed Pricing. Variable Pricing transforms Customers that are bad marketing risks for Marketers, and lost revenue opportunities for Communicators, into good marketing risks for Marketers, and new revenue opportunities for Communicators. Once Variable Pricing conventions are in place, linear programming techniques with integer programming and goal programming modifications are employed to achieve theoretically optimal derived value. This value is derived from the entirety of the salable communications ability of the Postal Item, not just from the sale of Surplus Weight. The ability to integrate higher order managerial prerogatives is also provided.

BRIEF DESCRIPTION OF THE DRAWINGS

FIG. 1 is a schematic view of an Offline Packet Construction System for Postal Inserts and Return Envelopes;

FIG. 2 is a schematic view of an Offline Packet Storage Transfer System;

FIG. 3 is a schematic view of an Offline Packet Storage System;

FIG. 4 is a schematic view of an Online Packet Retrieval Storage System; and FIG. 5 is a schematic view of a new Envelope Stuffing Machine with all Postal Objects delivered as Packets.

DETAILED DESCRIPTION OF THE PREFERRED EMBODIMENT OF THE INVENTION

The presented invention embodies three principal elements to provide Communicators the ability to achieve optimal economic efficiency in their postal operations. These fall under the headings of Variable Pricing, Value Maximization, and Cost Minimization.

Variable Pricing dramatically changes the economic potential of possible transactions between Marketers and Communicators, and fundamentally changes the way business is done between them. The algorithm to realize Basic Variable Pricing is presented herein. Under Basic Variable Pricing, Customer Access Charges for any Postal Object vary in relation to the Probabilities of Success on a Customer-specific basis.

Value Maximization provides the ability for Communicators to extract the theoretical maximum value possible out of the totality of the Postal Item, albeit ignoring the operational cost implications (other than postage). Value is defined as revenue modifiable by managerial prerogatives or overrides to be explained shortly under "Principal Element 2: Value Maximization."

Cost Minimization is the element of the presented invention that uncouples any, and all, revenue/value side activity from cost consequences. The new hardware restructures current Postal Item processing so that additional Postal Insert combinations (or combinations of any Postal Objects) do not increase direct operating costs in any manner. Cost implications are ignored with respect to value/revenue side activity because they have become irrelevant. Direct operating costs of daily production are driven downward to a single overhead cost that is invariant to the number of combinations processed by this last element of the presented invention. In other words, the interruptions and costs resulting from numerous Set Ups have been eliminated.

Principal Element 1: Variable Pricing

Fixed Pricing, wherein all Postal Objects (mostly Postal Inserts) incur the same costs for a given Marketer, is the industry standard. Table 1 depicted two Customers. Fixed Pricing made Customer 1 a good marketing risk for the expense of a communication and Customer 2 a bad marketing risk. The rational response of the Marketer to these two Customers is to express desire to mail a Postal Insert to Customer 1 and to decline the opportunity to mail a Postal Insert to Customer 2. Under Fixed Pricing Communicators are literally offering Marketers "take it or leave it" propositions. This might be justifiable where substantial demand for Customer access existed and most of a Communicator's Surplus Weight was being sold. But, since most Surplus Weight is unsold, this is not the case. The proper reaction by a Communicator should be the same as that of a seller faced with the inability to sell a good or service: lower the transaction price. In this case the price is the Customer Access Charge. The Customer Access Charge is, for all intents and purposes, the only line item affecting the economics of these potential transactions that is not fixed. Table 2 depicted a price reduction that transformed Customer 2 into a profitable opportunity for both Marketers and Communicators. Table 3 shows the exact price reduction needed to transform Customer 2 into a marketing risk identical to that of Customer 1.

TABLE 3

| | Customer 1 | Customer 2 | Difference (2 − 1) |
|---|---|---|---|
| 1. Probability of Success | 0.0100 | 0.0080 | −0.0020 |
| 2. Gross Profit | $5.0000 | $5.0000 | $0.0000 |
| 3. Printing Cost | $0.0050 | $0.0050 | $0.0000 |
| 4. Customer Access Charge | $0.0400 | $0.0308 | −$0.0092 |
| 5. Inserting Cost | $0.0010 | $0.0010 | $0.0000 |
| 6. Other Cost | $0.0000 | $0.0000 | $0.0000 |
| 7. Expected Gross Profit (1 * 2) | $0.0500 | $0.0400 | −$0.0100 |
| 8. Total Costs (3 + 4 + 5 + 6) | $0.0460 | $0.0368 | −$0.0092 |
| 9. Expected Net Profit (7 − 8) | $0.0040 | $0.0032 | −$0.0008 |
| 10. Expected Net ROI (100 * 9/8) | 8.6957% | 8.6957% | 0.0000% |

Every dollar spent by Marketers on Customers like Customer 2 is expected to yield the same profit rate as that of every dollar spent on Customers like Customer 1. But now more profit opportunities exist because more Customers are profitable marketing risks. Communicators increase the value of their Surplus Weight and communications ability as Customers heretofore incapable of generating revenue under Fixed Pricing are now generating revenue under Variable Pricing. Under a basic Variable Pricing scheme where prices are set to normalize ROI across all Customers, Communicators are actually selling pure, unadulterated Expected Net ROI (ENROI) which is now also in significantly greater supply. For a Marketer, the formula for ENROI is given by Equation 1.

$$\text{Equation 1:} \quad ENROI = 100 * PS * 6P - \frac{(PC + IC + OC + CAC)}{(PC + IC + OC + CAC)}$$
$$= 100 * \left[ \frac{PS * GP}{(PC + IC + PC + CAC)} - 1 \right]$$

where PS is the Probability of Success for a Postal Insert, GP is the Gross Profit of the Postal Insert, PC is the Printing Cost of the Postal Insert, OC is Other Costs for the Postal Insert, and CAC is the Customer Access Charge for the Postal Insert. ENROI is a function of CAC, the Customer Access Charge.

Equation 1 can be reworked algebraically as Equation 2 so that CAC is stated as a function of ENROI.

$$\text{Equation 2:} \quad CAC = \left| \left[ \frac{(100)}{(ENROI + 100)} \cdot GP \right] \cdot PS - \left[ (PC + IC + OC) \right] \right|$$
$$= M \cdot PS - b$$

Equation 2 provides the basic relationship between the Customer Access charge and all other variables. When stated in terms of m (the terms in the first bracket), b (the terms in the second bracket), and PS (the Probability of Success), Equation 2 is a well-known algebraic formula for line. Equation 2 is used to equalize ENROI across all Customers by setting Customer-specific Customer Access Charges based on Customer-specific estimates of Probabilities of Success. That is, a Marketer can provide a value for the "m" term to the Communicator. The proposed invention will then determine the Customer-specific Customer Access Charges based on that "m" term and the components of the "b" term (the Printing Cost, the Inserting Cost, and any Other per Postal Object Costs).

Principal Element 2: Value Maximization

Variable Pricing creates an environment in which all "first order" structural barriers to economic efficiency in Marketer-Communicator relations have been removed. Economic inefficiency is reflected by the mutually beneficial transactions that could take place between Marketers and Communicators but do not in fact take place due to the rigidity in setting the Customer Access Charges under Fixed Pricing. These inefficiencies are eliminated by Variable Pricing.

However, we exist in a complex world where more than just the financial calculations that appear in the Customer-specific balance sheets for available Postal Objects (e.g., Tables 1 through 3) enter the picture. Higher order evaluations on the best use of the communications ability supplied by Surplus Weight may come into play. These may represent managerial prerogatives that legitimately may override the pure marginal economics illustrated in Tables 1, 2, or 3.

The Value Maximizer element of the presented invention allows managerial prerogatives to provide a superceding, higher order valuation to any Customer-Marketer combination. These managerial prerogatives provide additional criteria for permitting a Marketer to send a Postal Object to an individual Customer. Categories of managerial prerogatives are:

Unacceptable or Do Not Use—under no conditions is the specific Customer to receive the Postal Object Absolute Priority—the Customer is to receive the Postal Object without regard to any constraint violations High Priority—as many of these Postal Objects as possible are to be included in the Customer's Postal Item provided Surplus Weight and Maximum Postal Objects constraints are not exceeded Normal Priority—the Postal Object is to be sent to the Customer provided it is optimal for the Communicator Communicators apply one of these classifications to every combination of Customer and Postal Object. A classification of "Unacceptable" means that under no circumstances is the Customer to receive the particular Postal Object. A classification of "Normal" means that a Customer is assigned the Postal Object only if it is determined to be a component of the optimal combination of Postal Objects for the Customer. Any Postal Object designated as "Absolute" priority will unconditionally be sent to the Customer. A "High" priority Postal Object will be sent to a Customer only if it does not violate the Surplus Weight or Maximum Postal Objects constraints for that Customer. The following scenarios, using Postal Inserts with varying classifications, illustrate the difference between these latter two priorities. Assume a Customer's Basic Mailing (an Outgoing Envelope, a Return Envelope, and a number of Bill Pages) weighs 26 grams and all Postal Inserts weigh 3 grams. Since the Customer must receive the components of a Basic Mailing the Required Weight is 26 grams. Further, assume all Postal Inserts were initially given "Normal" priority. In that case, no Postal Inserts would be assigned since that would violate the Surplus Weight constraint of 2 grams. If the priority of a single Postal Insert were changed to "High" the Customer still would not receive it; a Postal Insert that weighed 3 grams cannot be accommodated by the 2 grams of Surplus Weight available. But reclassifying that same Postal Insert to "Absolute" priority would now insure the Customer would receive the Postal Insert. This is because Required Weight would now equal 29 grams and Surplus Weight would equal 27 grams. Lastly, assume the same 26 grams of Required Weight existed, all Postal Inserts weighed just 2 grams, and all Postal Inserts were initially given "Normal" priority. Since only one Postal Insert could be accommodated, the Postal Insert with the highest revenue would be used. But if any other Postal Insert, even one with the lowest revenue, were reclassified as "High" priority then it would be used instead of the one with the highest revenue.

In truly efficient postal operations, Communicators will be faced with a large number of Marketers accepting the contingent rates calculated through Variable Pricing and some level of higher order managerial prerogatives in the form of the prioritization scheme described above. In sum, almost every Customer will be a good marketing bet, to some degree, for every Marketer. Consequently, the multiple possibilities of access to each of these Customers are an extremely valuable asset for the Communicator to leverage. The question that should follow, therefore, is how can the Communicator optimize the value of its newfound ability to provide a highly focused, discounted communications medium to the multiple Marketers in this environment.

Briefly, the problem statement is to maximize the financial value (revenue unless modified by managerial prerogatives) derived from each Customer. This goal is subject to the constraints that the number of Postal Objects does not exceed the Maximum or Minimum Object Per Customer Constraints and the weight of all optional Postal Inserts does not exceed the Surplus Weight for the Customer.

This problem statement is the classic Linear Programming problem statement of Dantzig except for two modifications. The first modification is to convert the Linear Programming problem into an Integer Programming problem. This is necessary to restrict all activity variables (i.e., the number of each Postal Object) to be an integer. Additionally, constraints must be in place to insure that the solution values for all Postal Objects except Bill Pages must be 0 or 1. The second modification converts the Integer Programming problem into a Goal Integer Programming problem so managerial prerogatives can be incorporated. Goal Programming problems replace the scalar coefficients in the objective function of the classic Linear Programming problem with vector coefficients.

The preferred embodiment sets the Goal Programming coefficients for each of the activity variable (potential Postal Object) as a vector of dimension 4. The first element of the vector is used to indicate whether the particular Postal Object has a managerial prerogative of "Do Not Use". If so, it takes the value of −1, otherwise it takes the value of 0. The second element of the vector is used to indicate whether the particular Postal Object has an "Absolute" priority. If so, it takes the value of 1, otherwise it takes the value of 0. The third element of the vector is used to indicate whether the particular Postal Object has a "High" priority. If so, it takes the value of 1, otherwise it takes the value of 0. The fourth element of the vector holds the revenue, typically computed under Variable Pricing arrangements.

The resultant Goal Integer Programming is solved by modifications to the basic Simplex Algorithm of Dantzig. The incorporation of code to handle the "cutting plane" methodology restricts activity variables to integers.

Value Maximization derives the maximum total benefit (in Communicator terms) possible at the individual Customer level. The formulation of the Communicator problem statement as a variation of the classic Linear Programming problem guarantees that the presented solution is the theoretical maximum derivable valuation.

In the preferred embodiment, the problem is a large-scale database application. There are three main tables:

A Communicator Master Customer Table

A Master Marketer Variable Pricing Table

Marketer Object-Customer Tables

The Communicator Master Customer Table contains the Customer Identification Numbers (CIN) of the Customers whose bill will be processed on a given production day. The Master Marketer Variable Pricing Table contains the Object Type (Outgoing Envelope, Bill Page, Return Envelope, or Postal Insert), the Object Identification Number, and the particulars needed to compute the Customer-Specific Access Charges.

These specifics are the negotiated coefficient of Probability of Success (the "m" term from Equation 2), and the components of Total Costs (the Printing Charge, the Inserting Charge, and Other per Postal Object Charges). The Marketer Object-Customer Tables contain records with the CIN, the Managerial Prerogative, and the Probability of Success. The Communicator Master Customer Table and the Marketer Object-Customer Tables are assumed sorted by CIN.

For discussion purposes, it is assumed that the Communicator Master Customer Table and the Marketer Object-Customer Tables are perfectly consistent. That is, the CIN appear in the Object-Customer Tables if and only if they appear in the Communicator Master Customer Table. Exceptions to this are easily handled and need not be discussed here. Processing will consist of opening all tables for read access. Customer by Customer, each Marketer Object-Customer Table provides its Postal Object Type (either an Outgoing Envelope, a Return Envelope, a Bill Page, or a Postal Insert), its Postal Object Identification Number, a CIN-specific Probability of Success, and a CIN-specific Managerial Prerogative. The processing performs a table look-up against the Master Marketer Variable Pricing Table to obtain the components needed to determine the CIN-specific Customer Access Charge (the "m" term from Equation 2 and the various per Postal Object Costs). The processing then computes the CIN-specific Customer Access Charge. The processing then loads an initial Simplex Algorithm tableau and performs the CIN-specific Goal Integer Programming necessary to obtain the maximum theoretical value from the available Surplus Weight.

As the optimal, Customer-specific combinations of Postal Objects are determined a Customer Control File is recording the CIN, the optimal Postal Objects, and the necessary zip code related information of the Customer. At the end of the processing, this file can be sorted by the zip code related information necessary to achieve the greatest pre-sorting discounts possible offered by the postal service. The order of Customer information in this file will determine the actual order of Customer processing used during the actual final construction of mailable Postal Items by the hardware of the presented invention.

Principal Element 3: Cost Minimization

The value/revenue side solution would be ideal if a Communicator possessed technology capable of delivering any combination of Postal Objects from a multitude of possibilities to any Customer without serious cost implications. Unfortunately, this is not the case under prior art technology. In an efficient Postal Insert industry there will be a large number of third party Marketers desiring the deeply discounted, acutely focused communications the Communicators have to offer via Surplus Weight. The general result of Value Maximization will be a very large number of combinations of Postal Objects in Postal items. This large number of combinations would overwhelm the solutions offered by the prior art. This is because combinations of Postal Objects that cannot be constructed from existing bin contents necessitate costly Set Ups. As explained in the "Problems on the Cost Side of Postal Insert Operations: Marketer-Transmitter Relations" section, Assignments directly, but unpredictably, increase direct operating costs under the current technology. The fundamental cause of the additional Set Ups and associated costs is the limitation on the numbers of bins available. The solution provided by the presented invention removes and extends the practical limitations of the prior art on the number of bins available for all Postal Objects (not just Postal Inserts). Conceptually, the presented invention executes a single Set Up as an Offline pre-process. By doing so, daily production costs are reduced to a single overhead cost that is immune to the effects of vastly increased combinations of Postal Objects.

Hardware Innovations

The prior art technology is incapable of scaling to the number of bins envisioned by the technology of the presented invention. While increasing the number of bins along a conveyor belt might appear to be a theoretically equivalent solution, the behavior of relatively flimsy Postal Inserts on conveyer belts, over long distances, at the required ESM operating speeds undermines that solution. Technology limits the number of bins available under prior art. Actual physical space (i.e., room space) is the only limitation on the number of bins available under the lone conceptual Set Up of the presented invention. In short, the presented invention resolves the cost side problems of the prior art. There are five physical hardware Systems of the presented invention related to cost minimization. These are the Offline Packet Construction System, the Offline Packet Storage Transfer System, the Offline Packet Storage System, the Online Packet Retrieval Transfer System, and the new Online ESM. Control of any and all components of the Packets are controlled by these systems in the order listed above. FIG. 1 depicts the Offline Packet Construction System building Packets from a large number of potential Postal Inserts and Return Envelopes. FIG. 2 depicts the transfer of control of the Packets from the Offline Packet Construction System to the Offline Packet Storage Transfer System. FIG. 3 depicts the transfer of control of the Packets from the Offline Packet Storage Transfer System to the Offline Packet Storage System. FIGS. 1 through 3 depict the core functionality of the Offline processing of the presented invention. FIGS. 4 and 5 depict the core functionality of the modified Online processing. FIG. 4 depicts the transfer of control of the Packets from the Offline Packet Storage System to the. Online Packet Retrieval Transfer System. Lastly, FIG. 5 depicts the transfer of control of the Packets from the Online Retrieval Transfer System to the new ESM. These figures and systems are explained below.

The Offline Packet Construction System

The first innovation in the preferred embodiment of the invention is the Offline Packet Construction System. A Packet is a set of Customer-specific Postal Inserts and Return Envelopes Constructed in an Offline pre-process and is treated as a single entity in the Online Postal Item Construction process. Offline processing is any processing that takes place outside the few seconds required to Construct the Postal Item during final processing. Packet Construction machinery is used to Collect Postal Inserts and Return Envelopes to Construct a Packet in a distinct, pre-processing step to the actual Construction of a final Postal Item. There are a number of objectives for the Offline Packet Construction machinery. The first is to remove the restrictions on the number of bins available for holding Postal Inserts and Return Envelopes under a Set Up. The greater the number of bins available for these Postal Objects the greater the number of combinations that can be formed from the contents of the bins for a single, fixed Set Up charge. The presented invention envisions perhaps as much as 400 bins available to hold Postal Inserts and Return Envelopes. But presumably a much greater number of bins to hold Postal Inserts and Return Envelopes could even be accommodated by the presented invention. To permit the Offline Packet Construction to take place at slower but less error prone speeds, the Offline Packet Construction pre-process of the presented invention could take place one business day prior to final Postal Item Construction. This would do little harm to the value/revenue maximization process since the only potential determinant of a Customer Access Charge that could change in that one day would be the Customer's credit balance. Unbiased, one day ahead, predictors of that figure would work acceptably well. The Offline Packet Construction System depicted in FIG. 1 implies a much larger set of bins than is feasible under prior art. These bins are used to build Customer-specific combinations of Postal Inserts and Return Envelopes. Return Envelopes may also supply bang-tails (i.e., perforated panels attached to a flap of a Return Envelope).

FIG. 1 is a schematic depicting the Offline Packet Construction System for Postal Inserts and Return Envelopes. Elements B1 through B5 in the figure denote some specific bins that are positioned above a conveyor belt denoted as C. Element B1 is arbitrarily labeled "Bin 13", element B2 is arbitrarily labeled "Bin 99", and so on, to reinforce the notion that Customer-specific combinations of Postal Objects will only use a small number of these Objects and that these combinations will vary from Customer to Customer. In this particular instance, FIG. 1 is depicting the construction of a Customer-specific optimal Packet consisting of a Return Envelope that is being stored in Bin 344, and four Postal Inserts that are being stored in Bins 231, 152, 99, and 13, respectively.

The optimal Packet is being created in stages as the Conveyer Belt C moves over rollers R. As the position on the Conveyor Belt C designated to hold the optimal Packet of this particular depicted Customer passes under element B5 (Bin 344) the Return Envelope of the optimal Packet is dropped on to the Conveyor Belt C. This act is indicated by the downward arrow A5. As the Conveyor Belt C moves to the left, it will bring that same position on the Conveyor Belt under a second bin, denoted as element B4. At that point, the first of the four Postal Inserts in this Customer-specific optimal Packet will be added. This action is depicted by downward arrow A4. After this action the Packet that initially consisted of the Return Envelope stored in element B5 (Bin 344) now consists of that Return Envelope and the Postal Insert stored in element B4 (Bin 231). Analogously, the diagram depicts the continued building of the optimal Packet over time as that same position on the Conveyor Belt C moves under the Bins denoted B3, B2, and B1 (Bin 152, Bin 99, and Bin 13, respectively). The actions of these Postal Inserts being dropped on to the ever-growing Packet are indicated by downward arrows A3, A2, and A1, respectively. The figure depicts the transformation of the nascent optimal Packet through time. Element P1 depicts the Packet at a point in time when it only consists of a Return Envelope. Elements P2 through P5 respectively depict subsequent points in time when the Postal Inserts residing in then bins denoted as B4 through B1 continue to further form the optimal Packet. Lastly, element FP depicts the Packet at the end of the Conveyor Belt C. The leftward arrow A6 indicates that the fully formed final Packet will be transferred to the Offline Packet Storage Transfer System for the next step of processing.

The Offline Packet Storage Transfer System

Another innovation of the presented invention is the Offline Packet Storage Transfer System. In the preferred embodiment, Customer-specific combinations of Postal Inserts and Return Envelopes are produced by the Offline Packet Construction System. These Packets, however, are being produced by an Offline process and, by definition, cannot be used immediately in the Construction of final Postal Items. An Offline Packet Storage Transfer System Physical assumes control of the Packets as soon as they are produced. The function of the Offline Packet Storage Transfer System is to clear the output of the Offline Packet Construction System and to place the Packets into an Offline Packet Storage System. The function of the Offline Packet Storage System is to store the Packets in an orderly fashion for future retrieval and ultimate use by the new ESM described by the presented invention during final Postal Item Construction.

FIG. 2 depicts the continuing journey of the Packet created by the Offline Packet Construction System in FIG. 1. FIG. 2 depicts the leftmost portion of FIG. 1 using the exact same denotations in order to reinforce the continuity of the processing. FIG. 2 depicts the optimal Packet for the Customer, element FP, being grasped by an arm in the Offline Packet Storage Transfer System, denoted as element GA. The arm in the Offline Packet Storage Transfer System rotates the optimal Packet (element FP) about a pivot (element P) in order to remove the Packet from control of the Conveyor Belt C. The act of moving the Packet through space is denoted by the arc denoted as element A. The leftward arrow A7 denotes the imminent transfer of control of the Packet to the Offline Packet Storage System (not yet shown).

The Offline Packet Storage System

Another innovation herein is the Offline Packet Storage System. In the preferred embodiment, Customer-specific Packets are placed in Slots of the Offline Packet Storage System by the Offline Packet Storage Transfer System. The function of the Offline Packet Storage System is to hold the output of the Offline Packet Construction System for future use.

FIG. 3 depicts the last phase of Offline processing. The figure depicts the leftmost portion of FIG. 2 to reinforce continuity. FIG. 3 depicts the orderly sequential storage of optimal Customer-specific Packets (labeled FP-1 and FP-2) into an Offline Packet Storage System (element S). The upward arrow A8 indicates that the individual storage slots (labeled Slot #1 through Slot #3) are moving upward, relative to the arm of the Offline Packet Storage Transfer System. This permits successive optimal Customer-specific Packets to be stored in different Customer-specific storage compartments.

The Online Packet Retrieval Transfer System

Another innovation of the invention is the Online Packet Retrieval Transfer System. The function of the Online Packet Retrieval Transfer System is to retrieve the Packets stored in the Offline Packet Storage System and transfer them to the new ESM for final Postal Item Construction. This action is Online Processing as it takes place within seconds of final Postal Item Construction. The Online Packet Retrieval Transfer System is depicted in FIG. 4. The Online Packet Retrieval Transfer System performs the opposite function of the Offline Packet Storage Transfer System. It retrieves Packets for virtual immediate inclusion into a final, mailable Postal Item.

FIG. 4 depicts the first actions of the Online Packet Retrieval Transfer System. The slots in an Offline Packet Storage System (element S) are depicted as moving upward relative to the arm (element GA) of the Online Packet Storage Retrieval Transfer System. This insures the orderly, sequential retrieval of optimal Customer-specific Packets (elements FP-2 and FP-3) from the slots of the Offline Packet Storage System. Control of the optimal Customer-specific Packets is shown as moving from the Offline Packet Storage System to the arm (element GA) of the Online Packet Retrieval Transfer System by the rightward arrow A10. The purpose of the Online Packet Retrieval Transfer System is to take a Customer-specific Packet (element FP-2) from the Offline Packet Storage System (element S) and deliver it to the new ESM for final Postal Item processing. The arm of Online Packet Retrieval Transfer System rotates an optimal Packet (element FP-2) about a pivot (element P) in order to remove the Packet from control of the Offline Packet Storage System S. The act of moving the Packet through space is denoted by the arc denoted A. The rightward arrow A11 denotes the transfer of control of the Packet to a new ESM (not yet shown).

The New Envelope Stuffing Machines (ESM)

FIG. 5 depicts the last processing step of the presented invention. The figure depicts three Offline Packet Storage Systems (elements S1, S2, and S3) and three Online Packet Retrieval Transfer Systems (elements TS1, TS2, and TS3). These three pairs of components provide Outgoing Envelope Packets, Bill Page Packets, and Return Envelope/Postal Insert Packets, respectively, to the new ESM. The new ESM, element E, receives all Packets vian Online Packet Retrieval Transfer Systems. The Figure depicts the same numbered slots in each of the Offline Packet Storage Systems holding the different Packets of a single Customer.

As the formulation of the Customer-specific combinations of Postal Inserts and Return Envelopes has taken place during Offline processing, no disruptive Set Ups occur during final processing. In effect, a single Set Up with an arbitrarily large number of bins for Postal Inserts and Return Envelopes has been performed through the Offline Packet Construction process. The direct costs of Set Ups and the indirect costs of significant ESM "down time" have been eliminated. Consequently, fewer ESM will be needed to process the daily peak load of a Communicator. These indirect cost savings are substantial. The presented invention, by removing disruptive Set Ups from final processing, creates an environment in which the processing order of Customers does not affect direct operating costs of final processing. Accordingly, the order of Customer processing can be that order that achieves the maximum Postal pre-sorting discounts.

There are three Postal Objects in the preferred embodiment of the presented invention: Outgoing Envelope Packets, Bill Page Packets, and Postal Insert Packets. Postal Insert Packets are Customer-specific combinations of Postal Inserts and Return Envelopes. In a truly general economic environment, any of the Postal Objects should be capable of carrying information to a Customer and generating value/revenue for both Communicators and Marketers. For example, Outgoing Envelopes may be state specific or Bill Pages may be able to transmit third party information in their margins or through watermarks. When all of these redefined Postal Objects are available to the new ESM of the presented invention as Packets the complexities and inefficiencies of the prior art are removed. On the value/revenue side, theoretically optimal Assignments are being made for individual Customers. On the cost side, direct Set Up costs and indirect costs of machine interruptions are eliminated when the Offline Packet Storage Systems are large enough to hold a day's production quota (i.e., Offline Packet Storage Systems large enough satisfy ESM processing speeds). Direct costs of multiple Set Ups have been reduced to virtually one Set Up per machine. All that will be required of the Offline Packet Construction Systems is a full daily load of Postal Objects during Online Processing. FIG. 5 depicts the new ESM with Offline Packet Storage Systems for all Postal Objects.

Other reconfigurations of the new ESM could alter the possible ways Postal Objects other than Postal Inserts and Return Envelopes (i.e., Outgoing Envelopes and Bill Pages) are managed by Communicators. Prior art ESM (Phillipsburg Inserters) typically are configured with only one Outgoing Envelope bin and one Bill Page bin. The purpose for increasing the number of possible choices for Outgoing Envelopes and Bill Pages is to offer Communicators further choice for Customer-specific optimizations and, thus, potentially more value/revenue under a Set Up. A possible configuration that offers more choices for Outgoing Envelopes and Bill Pages is to simply provide more bins for them in conjunction with the Offline Packet Storage Systems to handle Postal Inserts and Return Envelopes. However, adding more bins for these Postal Objects provides only limited and non-scalable relief. Also, it permits the reintroduction of costly and disruptive Set Ups with widespread, uncontrolled Assignment policies for Outgoing Envelopes and Bill Pages. The ultimate answer is not, therefore, to add more bins for these Postal Objects, but rather to have these Postal Objects made available for final assembly and mailing through their own Offline Packet Storage Systems. Nonetheless, the presented invention does not preclude the use of multiple bins instead of Offline Packet Storage Systems to handle either Outgoing Envelopes, or Bill Pages, or both. The raw economics concerning the salability of third party communications through Outgoing Envelopes and Bill Pages should dictate this technology decision, not vice versa.

While the preferred embodiment of the invention has been depicted in detail, modifications and adaptations may be made thereto, without departing from the spirit and scope of the claim as delineated in the following claims:

What is claimed is:

1. A postal object selecting method in a mail packaging system, comprising the steps of:
   identifying a plurality of customers;
   identifying a plurality of postal objects;
   determining an access charge for each object for an associated customer to a marketer, said determining comprising the steps of:
   determining an expected gross profit to the marketer from the customer,
   determining a probability of success of the postal object with respect to the customer, and
   determining provisioning costs for the postal object;
   determining an expected return on investment for the marketer from one or more of the plurality of customers for one or more of said plurality of postal objects based on the determined access charge; and
   selecting one or more postal objects to be assembled into a mail package for one of said plurality of customers, such that expected return on investment from the customer for said mail package is substantially the same for each of the one or more of the plurality of customers.

2. The method of claim 1, further comprising the step of:
   determining an expected value of the mail package, wherein
   the selecting step selects the one or more postal objects from the plurality of postal objects to be assembled into the mail packages, such that the expected value for the mail package is maximized.

3. The method of claim 2, wherein the expected value for the mail package is a function of the access charge for each selected postal object and the provisioning costs, and object selection is subject to one or more predetermined constraints.

4. The method of claim 3, wherein each postal object has an object type selected from the group consisting of outgoing envelopes, primary documents, return envelopes, and inserts.

5. The method of claim 4, wherein the one or more predetermined constraints include at least one of a weight constraint and a number of postal objects constraint for each mail package.

6. The method of claim 5, wherein the number of postal objects constraint specifies at least one of a minimum number of objects constraint and a maximum number of postal objects constraint for each of one or more of the object types.

7. The method of claim 3, wherein object selection is also determined as a function of managerial prerogatives.

8. The method of claim 7, wherein the managerial prerogatives may specify a status by customer for each selectable postal object, which specified status includes one of "do not use", "absolute priority", "high priority" and "normal priority".

9. The method of claim 5, wherein the weight constraint is specified as a total weight of all postal objects included in the mail package.

10. The method of claim 6, wherein one of the one or more postal objects selected for each mail package are assembled into one or more object packets, and the mail package is assembled from at least one of the one or more object packets one or more of the plurality of postal objects.

11. The method of claim 10, wherein the one or more object packets and/or single postal objects are assembled by offline processing.

12. The method of claim 11, wherein the plurality of mail packages are assembled by online processing.

13. The method of claim 12, wherein the one or more object packets produced by offline processing are stored in a packet storage device and retrieved for online processing.

14. The method of claim 12, wherein the storage and retrieval steps are performed by one or more packet retrieval transfer devices.

15. The method of claim 3, wherein the selection step is performed using goal integer programming.

16. The method of claim 3, wherein provisioning costs include printing and ink costs.

17. The method of claim 6, wherein the one or more object types include inserts.

18. The method of claim 7, wherein the selection step is performed using goal integer programming.

19. An object selecting method in a packaging system, comprising the steps of:
   identifying a plurality of customers;
   identifying a plurality of postal objects;
   determining an access fee for each postal object for an associated customer to a marketer,
wherein each access fee is variably determined;
   determining an expected return on investment to the marketer from one or more of the plurality of customers for one or more of said plurality of postal objects based on the determined access fee; and
   selecting one or more postal objects to be assembled into a package for one of said plurality of customers, such that the expected return on investment from the customer for said package is substantially the same for each of the one or more of the plurality of customers.

20. The method of claim 19, wherein
   the selecting step selects one or more postal objects from the plurality of postal objects to be assembled into a package to be provided to each of the customers, such that the expected return on investment for each customer is maximized.

21. The method of claim 19, wherein the expected return on investment for each customer is a function of the access fee for each selected postal object and provisioning costs, and object selection is further subject to one or more predetermined constraints.

22. The method of claim 21, wherein the plurality of postal objects includes sales offers for unsold airline seats.

23. The method of claim 21, wherein the plurality of postal objects includes sales offers for unsold shipping capacity.

24. The method of claim 21, wherein the plurality of postal objects includes sales offers to be provided in postal mail packages directed to each of the plurality of customers.

* * * * *